United States Patent [19]

Parker et al.

[11] Patent Number: 5,729,734
[45] Date of Patent: Mar. 17, 1998

[54] FILE PRIVILEGE ADMINISTRATION APPARATUS AND METHODS

[75] Inventors: Robert D. Parker; Matthew S. Holloway, both of San Jose, Calif.

[73] Assignee: Apple Computer, Inc., Cupertino, Calif.

[21] Appl. No.: 552,942

[22] Filed: Nov. 3, 1995

[51] Int. Cl.$^6$ ................................................ G06F 15/16
[52] U.S. Cl. ...................... 395/609; 395/332; 395/187.01
[58] Field of Search ........................... 395/609, 327–332, 395/186, 187.01, 610

[56] References Cited

U.S. PATENT DOCUMENTS

| | | | |
|---|---|---|---|
| 5,423,034 | 6/1995 | Cohen-Levy | 395/610 |
| 5,550,968 | 8/1996 | Miller et al. | 395/332 |
| 5,579,478 | 11/1996 | Heiserman et al. | 395/186 |

OTHER PUBLICATIONS

"Apple Share Administrator's Guide," Version 4.0, pp. 27–46 of Chapter 2, 1993, Apple Computer, Inc., Cupertino, CA.

*Primary Examiner*—Thomas G. Black
*Assistant Examiner*—Hosain T. Alam
*Attorney, Agent, or Firm*—Hickman Beyer & Weaver

[57] ABSTRACT

An improved file service administration method is disclosed in a computer network having an administrator account and a user account. The administrator account has an administrator privilege, and the user account has a user privilege which is different from the administrator privilege. The computer network further includes at least one sharepoint that is selectively accessible through the user account. The includes the step of displaying, in accordance with the administrator privilege and through the administrator account, the sharepoint on the computer display screen. There is further included the step of modifying, through the administrator account, the access privilege for the user account. Furthermore, the method includes the step of displaying, in accordance with the user privilege and through the administrator account, the sharepoint and the access privilege for the user account. The sharepoint, when displayed in accordance with the user privilege, is represented in a first state when the access privilege for the user account to the sharepoint is enabled. On the other hand, the sharepoint is represented in a second state when the access privilege for the user account to the sharepoint is not enabled.

18 Claims, 12 Drawing Sheets

FILE PRIVILEGE ADMINISTRATION APPARATUS AND METHODS

BACKGROUND OF THE INVENTION

This invention relates generally to computer systems and networks. More particularly, the present invention relates to novel methods and apparatus for controlling and monitoring user access to shared resources on a computer network.

Computer networks are known. In a computer network, multiple server machines and terminals are coupled together using a common bus. On such a network, a network resource such as a file, a folder or a disk on a particular server machine may be shared by the network users, who typically access the network through network terminals. Typically, the sharing process is administered by a human network administrator, who is responsible for setting the network users' access privileges and for monitoring their access.

In access privilege setting, the network administrator controls access to resources that are shared among the network users. Each user is assigned different privileges for the various resources located on the various servers within the computer network. For example, some users may be permitted to make changes only to certain files, while other users may only be allowed to view the files. In this example, access privilege setting therefore defines which files a particular network user is allowed to view and/or make changes on.

Monitoring access, on the other hand, permits the system administrator to review the access privileges possessed by a particular user. By monitoring access, the system administrator is able to determine whether a particular user has been granted the desired level of access. If not, changes thereto may be accomplished through the aforementioned access privilege setting process.

As is known, there are many types of computer networks in existence. They are known by various names, including Local Area Network (LAN), Wide Area Network (WAN), Internet, and the like. These computer networks may be implemented in accordance with a variety of known architectures. FIG. 1 illustrates an example of a computer network architecture commonly known as a client-server network. In a client-server network, there are a plurality of servers such as servers 101 and 102, coupled to a network bus 110. There are also a plurality of client terminals, such as client terminals 104 and 106, that are coupled to the same network bus 110. Although only servers 101 and 102 are depicted, it should be noted that any number of servers may be connected to network bus 110, and any number of client terminals may also be connected to network bus 110. Each of the client terminals are typically capable of communicating with any one of servers 101 and 102 using one of the known network protocols such as AppleTalk™, Token Ring, TCP/IP, and the like. The servers and terminals of network 100 may be geographically dispersed to suit the needs of an organization.

A given server 101 may also be coupled to one of the network's central file storage facilities, e.g., a large persistent memory device such as a hard disk, a RAID system (redundant array of inexpensive disks), an opto-magnetic storage device, and the like (omitted from FIG. 1 for clarity). A file service application installed on that server performs tasks related to file management for the benefit of users on client terminals 104 and 106. Such tasks include, for example, access privilege management for the resources on that server, storage space management, and the like. A given file service may serve multiple client terminals simultaneously. Likewise, a client terminal may establish logical sessions with multiple file services simultaneously, either on a single server or on different servers.

Each network file service on servers 101 and 102 is in turn managed by the network administrator, who is responsible for setting the attributes and parameters for the file service, setting and re-setting the users' access privileges, maintaining and upgrading the service, and the like. Typically, this administration task is performed from an administrative console 108. By way of example, the network administrator may employ administrative console 108 to set a particular user's access privilege to files managed by the file service installed on any of servers 101–102. That user's access privileges may then be saved to a file, to be consulted by the file service to determine whether that user has sufficient access privilege to one of the server files or folders.

In the prior art, there exist a number of access privilege setting methods. FIG. 2A shows, for illustration purposes, aspects of a prior art access privilege setting mechanism that is implemented in a product known as AppleShare™, available from Apple Computer, Inc., assignee of the present invention. In FIG. 2A, there is shown a GUI window 200 for displaying and modifying user access to its displayed sharepoints. As the term is used herein, a sharepoint is an item, e.g., a file, a folder, a volume, a hard disk, or the like, that is capable of being shared by the network users. A pop-up menu 202 and sub-window 203 show respectively a parent and its child items. In the present example, the item "DESKTOP" is chosen as the parent, which is shown to have the child item "Hard Disk C," representing a sub-folder within item "DESKTOP."

Within item "Hard Disk C," there are a plurality of shared items, i.e., items that can be shared by the network users. In the present example, shared folder XYZ, representing a shared item within folder "Hard Disk C," is shown in a sub-window 205. XYZ folder is shown in a selected state, which allows the network administrator to administer its user access.

In FIG. 2A, the network administrator is the owner of the selected XYZ folder (as shown by box 208). The owner of an item, such as XYZ folder, is typically the creator of that item, or any registered user or group to whom the preceding owner assigns ownership. In the example of FIG. 2A, the administrator is shown, through checked boxes 212, 214, and 216, to have privileges to see the folders within a selected item, e.g., XYZ folder, to see files within that folder, and to make changes thereto. A user "Ross" is shown to have none of the above privileges for XYZ folder. However, the privileges for user "Ross" may be modified by appropriately checking combinations of boxes 213, 215, and 217 for that user. Also, a user's name other than "Ross" may be entered in box 210 to permit the network administrator to set the privileges for that user with respect to selected shared XYZ folder.

In FIG. 2B, XYZ folder of FIG. 2A is selected to be the parent item (as shown in pop-up 202). A plurality of sub-folders including Folder A, Folder B, Folder C and Folder D, representing the sub-folders within parent folder XYZ, are shown in sub-window 203. Further Folder D, shown in its selected state, is now the folder selected for access control. In FIG. 2B, the administrator is again shown to have privileges to see folders, see files, and make changes. The aforementioned user "Ross" now possesses the same privileges as the administrator with respect to Folder D, e.g., the ability to see folders, see files, and make changes thereto.

As is apparent, by navigating through the file hierarchy using windows 202, 203, and 205 and setting access privileges via boxes 208, 210, and 212–217, it is possible to set any user's access privilege for any shared item using the prior art access privilege setting scheme of FIGS. 2A and 2B.

It has been recognized, however, that further improvements on the prior art access privilege setting scheme may be made. By way of example, one area of improvement relates to the setting of access privileges for sub-folders. To illustrate, consider the situation where the network administrator grants a particular user access privileges to a given sub-folder. If the subject sub-folder is a child folder of a parent folder to which that user has no access privilege, the fact that that user has been granted access to the subject sub-folder is essentially irrelevant. This is because that user is still effectively locked out of the parent folder and would therefore have no way to gain access to the subject sub-folder for which he or she has been granted access privilege. In the context of the examples of FIGS. 2A and 2B, user "Ross" cannot access child folder "Folder D" since he is effectively locked out of parent folder "XYZ."

The problem is especially difficult to detect when the subject sub-folder is separated from the parent folder by many layers in the file hierarchy chain. Because of this problem, network administrators are often not aware of a particular user's access difficulties until that user alerts them that access to a particular folder is not possible because of an inaccessible parent folder.

In the prior art, the network administrator typically solves this problem by obtaining a file hierarchy list, which shows the relationship between a subject folder and its parent folders in the chain, and tracing up the chain to ascertain the exact parent folder in the chain at which access is inadvertently denied. However, such tracing is time consuming.

Alternatively, the administrator could review a user's access privileges to the file hierarchy by logging onto the network as that user, i.e., through that user's account. This would require the administrator to know the user's password, which typically he cannot or does not know. Moreover, the administrator would not be able to make corrections to the user's access privileges from the client terminal. Instead, the administrator must return to the administrative console to make access privilege changes through the administrator's account.

More significantly, the possibility that an inaccessible parent folder may inadvertently block a user's access means that the network administrator in the prior art has no way of being sure how a particular access privilege setting action on a shared sub-folder will ultimately affect a user's ability to access that sub-folder. Tracing through the file hierarchy, as discussed above, is a less than satisfactory way to ensure proper access. In a network that includes a multiplicity of users and thousands of folders and sub-folders, such tracing may well be impossible.

In view of the foregoing, what is needed is improved file service administration methods and apparatus that allow a network administrator to efficiently ascertain the actual ability of a selected user to access the shared folders in a network and to efficiently make changes to that user's access privilege.

SUMMARY OF THE INVENTION

The invention relates, in one embodiment, to a method of assigning access privilege on a computer display screen to the sharepoint for the user account in a computer network having an administrator account and a user account. The administrator account preferably has an administrator privilege while the user account has a user privilege different from the administrator privilege. The computer network further includes at least one sharepoint that is selectively accessible by the user account. In this embodiment, the method includes the step of displaying, in accordance with the administrator privilege and through the administrator account, the sharepoint on the computer display screen.

Further, the method includes the step of modifying, through the administrator account, the access privilege for the user account. Additionally, there is provided the step of displaying, in accordance with the user privilege and through the administrator account, the sharepoint and the access privilege for the user account. The sharepoint, when displayed in accordance with the user privilege, is represented in a first state when the access privilege for the user account to the sharepoint is enabled. On the other hand, the sharepoint, when displayed in accordance with the user privilege, and is represented in a second state when the access privilege for the user account to the sharepoint is not enabled.

In another embodiment, the invention relates to an apparatus for assigning access privileges to a sharepoint in a computer network having an administrator account and a user account. The administrator account preferably has an administrator privilege while the user account has a user privilege different from the administrator privilege. In this embodiment, the sharepoint is preferably selectively accessible by the user account. The apparatus includes means for displaying, in accordance with the administrator privilege and through the administrator account, the sharepoint on a computer display screen. There is also included means for modifying, through the administrator account, the access privilege for the user account.

Additionally, there is provided means for displaying, in accordance with the user privilege and through the administrator account, the sharepoint and the access privilege for the user account. The sharepoint, when displayed in accordance with the user privilege, is represented in a first state when the access privilege for the user account to the sharepoint is enabled. On the other hand, the sharepoint, when displayed in accordance with the user privilege, and is represented in a second state when the access privilege for the user account to the sharepoint is not enabled.

In yet another embodiment, the invention relates to a computer readable medium containing program instructions for assigning access privileges to a sharepoint for a user account in a computer network having an administrator account and the user account. The administrator account has an administrator privilege while the user account has a user privilege different from the administrator privilege. Furthermore, the computer network includes at least one sharepoint that is selectively accessible by the user account. In this embodiment, the instructions including the steps of displaying, in accordance with the administrator privilege and through the administrator account, the sharepoint on the computer display screen. Further, there is included the steps of modifying, through the administrator account, the access privilege for the user account.

Additionally, there is also provided the step of displaying, in accordance with the user privilege and through the administrator account, the sharepoint and the access accordance wit the user account. The sharepoint, when displayed in accordance with the user privilege, is represented in a first state when the access privilege for the user account to the sharepoint is enabled. On the other hand, the sharepoint, when displayed in accordance with the user privilege, is represented in a second state when the access privilege for the user account to the sharepoint is not enabled.

These and other features and advantages of the present invention will become apparent upon reading the following detailed descriptions and studying the various figures of the drawings.

DESCRIPTION OF THE PREFERRED EMBODIMENT

Figure 1:
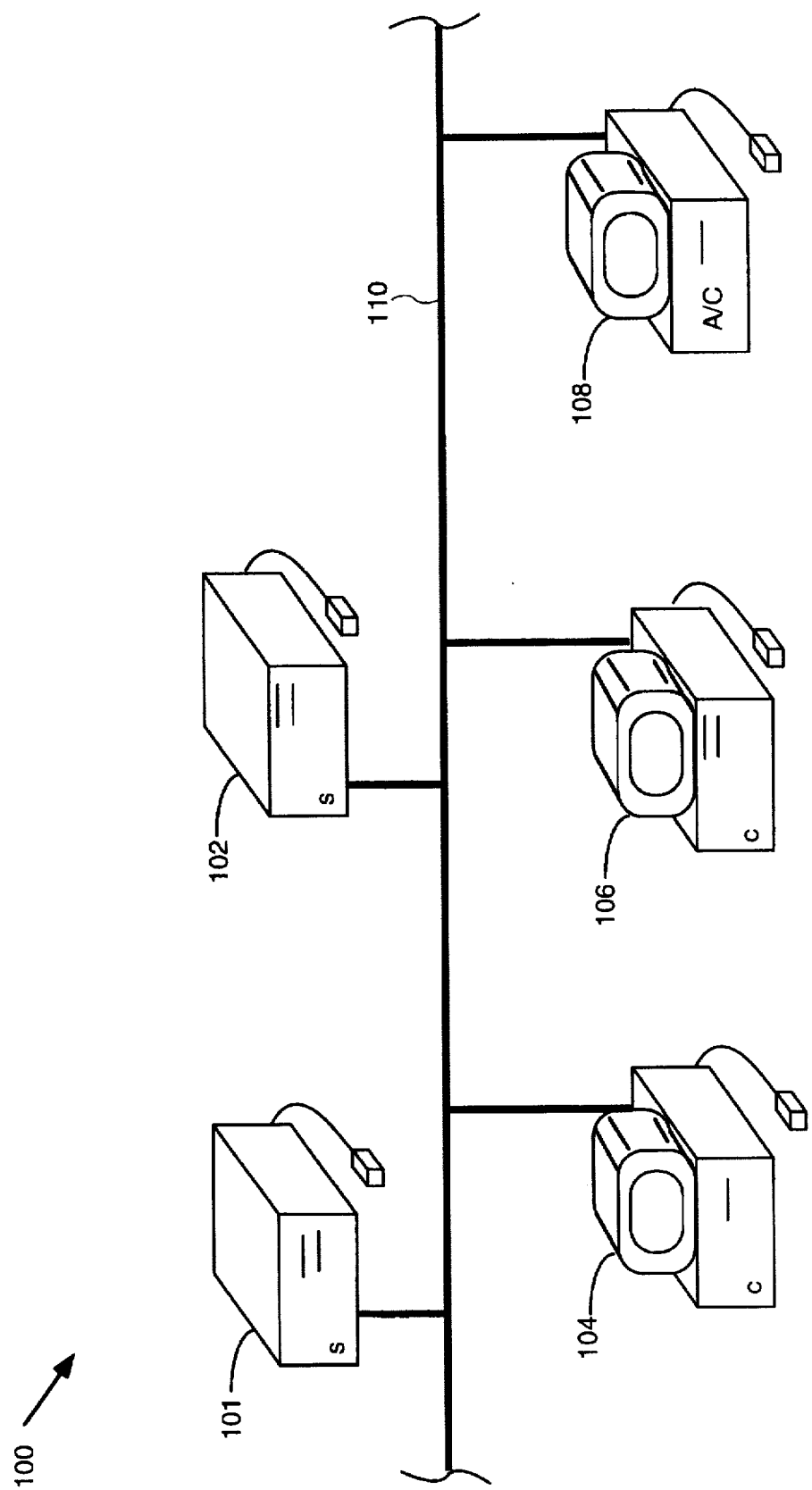
FIG. 1 illustrates a simplified network diagram having a plurality of server terminals, client terminals and an administrative console.
Figure 2A:
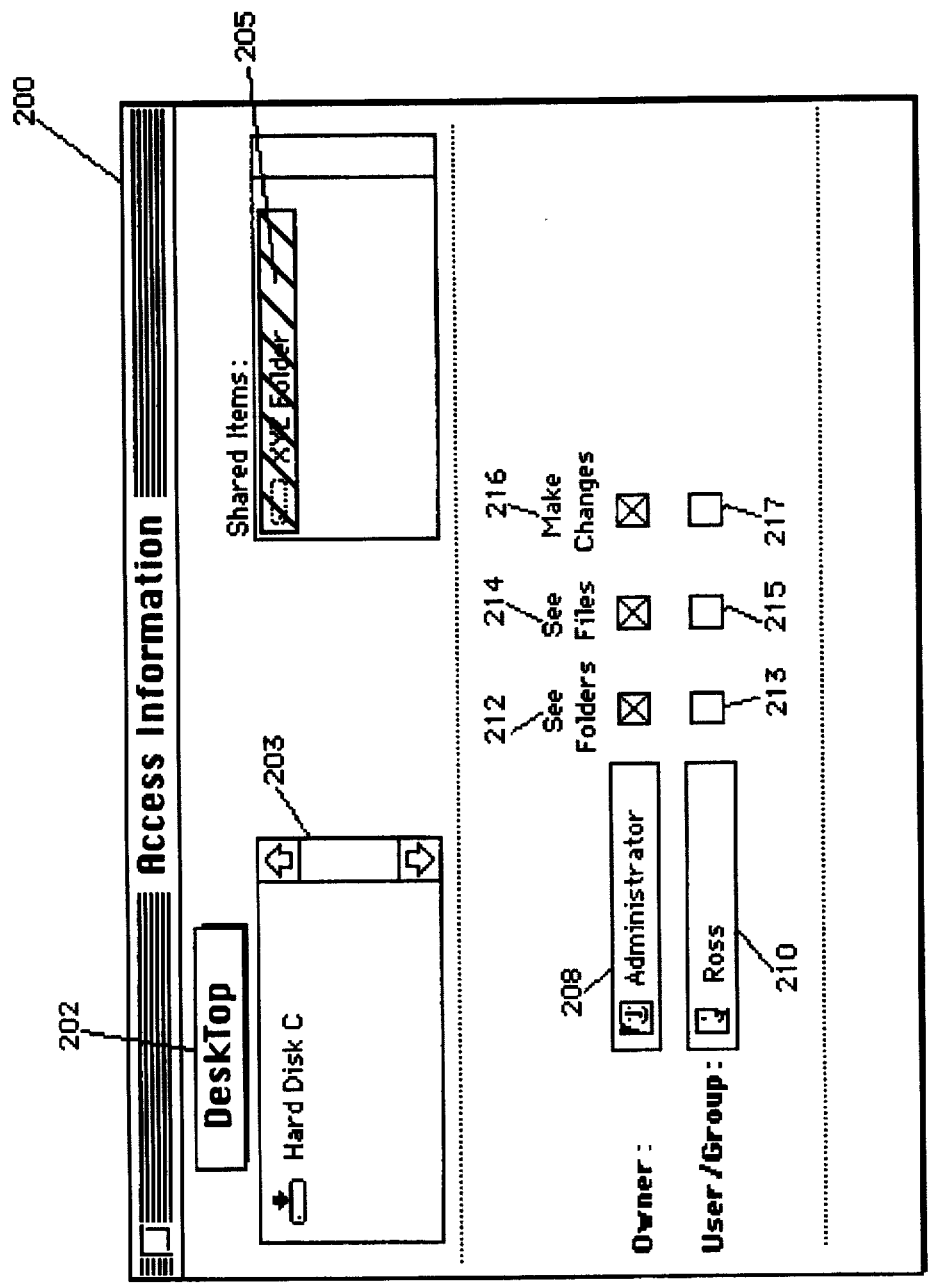
FIG. 2A illustrates a prior art access privilege setting scheme.
Figure 2B:
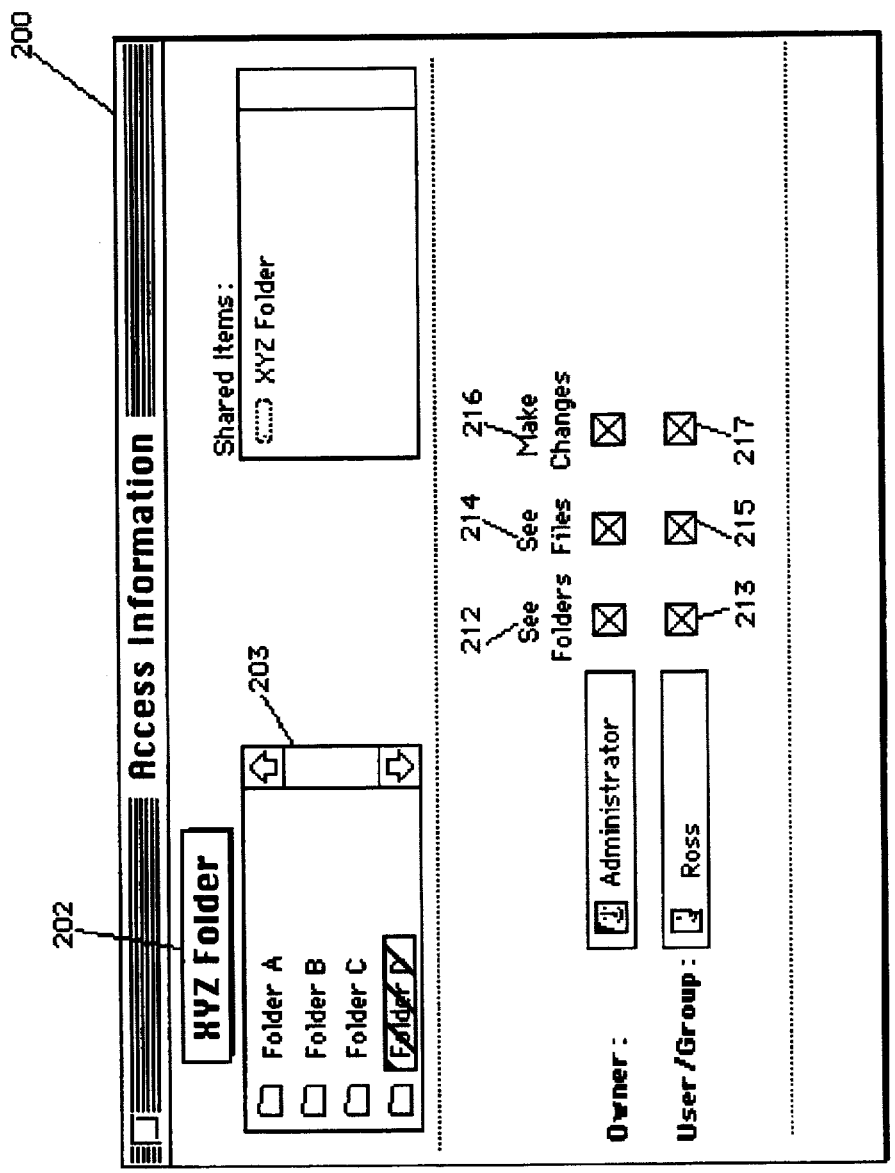
FIG. 2B shows in a GUI window, a prior art access privilege control panel indicating full access to a selected folder located within the selected sharepoint of FIG. 2A.

FIG. 1 illustrates a simplified network diagram having a plurality of servers, client terminals and at least one administrative console. FIGS. 2A and 2B illustrate one prior art access setting method.

Figure 3:
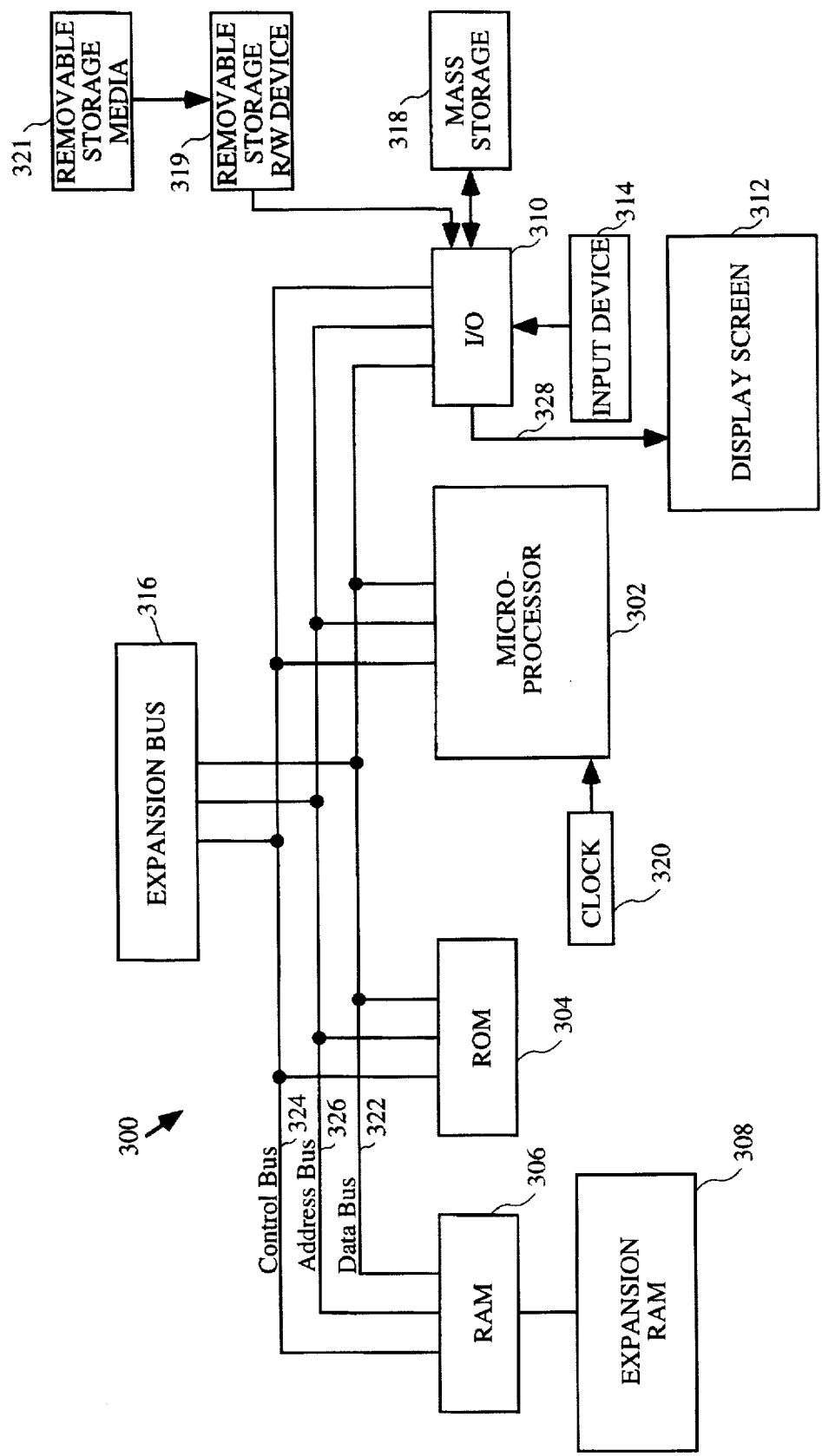
FIG. 3 shows, in one aspect of the present invention, a computer system for implementing the inventive methods and apparatus.

FIG. 3 shows a general purpose computer system. Generally speaking, either the server, the client terminal, or the administrative console may be implemented by the general purpose computer system of FIG. 3. However, the servers (and usually the administrative console) are typically provided with speedier processors and greater storage capacities than client terminals to handle their greater data processing needs.

Referring now to FIG. 3, a computer system 300 in accordance with the present invention includes a central processing unit (CPU) 302, read only memory (ROM) 304, random access memory (RAM) 306, expansion RAM 308, input/output (I/O) circuitry 310, display assembly 312, input device 314, and expansion bus 316. Computer system 300 may also optionally include a mass storage unit 318 such as a disk drive unit or nonvolatile memory such as flash memory and a real-time clock 320.

CPU 302 is preferably a commercially available, single chip microprocessor such as one of the Intel X86 or Motorola 680XX family of chips, and is preferably a reduced instruction set computer (RISC) chip such as the PowerPC microprocessor available from Motorola, Inc. CPU 302 is coupled to ROM 304 by a data bus 322, control bus 324, and address bus 326. ROM 304 contains the basic operating system for the computer system 300. CPU 302 is also connected to RAM 306 by busses 322, 324, and 326 to permit the use of RAM 306 as scratch pad memory. Expansion RAM 308 is optionally coupled to RAM 306 for use by CPU 302. CPU 302 is also coupled to the I/O circuitry 310 by data bus 322, control bus 324, and address bus 326 to permit data transfers with peripheral devices.

I/O circuitry 310 typically includes a number of latches, registers and direct memory access (DMA) controllers. The purpose of I/O circuitry 310 is to provide an interface between CPU 302 and such peripheral devices as display assembly 312, input device 314, and mass storage 318.

Display assembly 312 of computer system 300 is an output device. In the case of certain computers, such as the Apple™ Newton™, display assembly 312 also serves as a part of the input device. When operating as an input device, a position-sensing apparatus disposed on the surface of display assembly 312 works in cooperation with input device 314 to receive data input from the user. Accordingly, it is coupled to I/O circuitry 310 by a data bus 328. When operating as an output device, the display assembly 312 receives data from I/O circuitry 310 via bus 328 and displays that data on a suitable screen. Note that unless display assembly 312 serves an input function, it is not absolutely necessary that data bus 328 be bi-directional.

The screen for display assembly 312 can be a device that uses a cathode-ray tube (CRT), liquid crystal display (LCD), or the like, of the types commercially available from a variety of manufacturers. Input device 314 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 318 is generally considered desirable. However, mass storage 318 can be eliminated by providing a sufficient amount of RAM 306 and expansion RAM 308 to store user application programs and data. In that case, RAMs 306 and 308 can optionally be provided with a backup battery to prevent the loss of data even when computer system 300 is turned off. However, it is generally desirable to have some type of long term mass storage 318 such as a commercially available hard disk drive, nonvolatile memory such as flash memory, battery backed RAM, PC-data cards, or the like.

A removable storage read/write device 319 may be coupled to I/O circuitry 310 to read from and to write to a removable storage media 321. Removable storage media 321 may represent, for example, a magnetic disk, a magnetic tape, an opto-magnetic disk, an optical disk, or the like. Instructions for implementing the inventive method may be provided, in one embodiment, to the network of FIG. 1 via such a removable storage media.

In operation, information is inputted into the computer system 300 by typing on a keyboard, manipulating a mouse or trackball, or "writing" on a tablet or on position-sensing screen of display assembly 312. CPU 302 then processes the data under control of an operating system and an application program stored in ROM 304 and/or RAM 306. CPU 302 then typically produces data which is outputted to the display assembly 312 to produce appropriate images on its screen.

Expansion bus 316 is coupled to data bus 322, control bus 324, and address bus 326. Expansion bus 316 provides extra ports to couple devices such as network interface circuits, modems, display switches, microphones, speakers, etc. to CPU 302. Network communication is accomplished through the network interface circuit and an appropriate network.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 4:
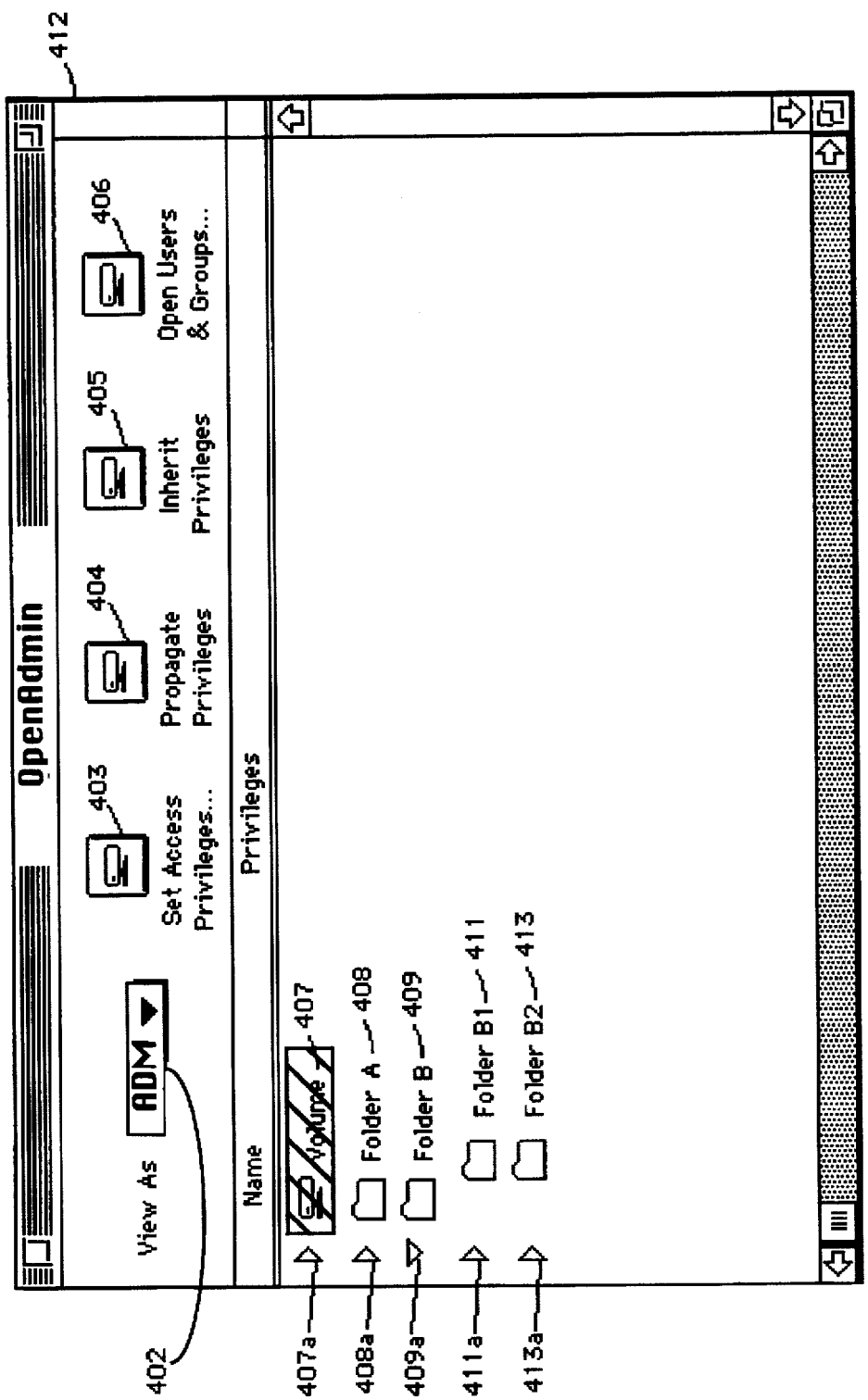
FIG. 4 shows, in one aspect of the present invention, a GUI window having a View-As selection option.

FIG. 4 shows a GUI window 412, representing the window for implementing the improved file service administration apparatus (IFSA) of the present invention. At the top left-hand corner of window 412, there is shown a "View-As" pop-up icon 402. In accordance with one aspect of the present invention, the network administrator may employ View-As pop-up icon 402 to view the list of volumes and folders on a particular server from either the perspective of the network administrator himself or from the perspective of a user or group. When the volumes and folders (i.e., items) are viewed from the perspective of the network administrator, they are presented in window 412 in accordance with the administrator's privileges. Consequently, all volumes and folders are displayable and can have their access privileges modified.

On the other hand, when the volumes and folders are viewed from the perspective of a network user or group without the administrator's privileges, they are displayed in accordance with that users or group's privileges. As such, the volumes and folders to which that user or group has the actual ability to access are indicated. Other volumes and folders may be hidden or shown in a special format to indicate to the network administrator that they am inaccessible to that user or group.

By way of example, the View-As pop-up 402 reads "ADM" in FIG. 4, signifying that the administrator, working from the administrative console 108 of FIG. 1, is currently employing the improved file service administration apparatus (IFSA) to view all the items, which include volumes, folders, files and the like located on a particular network server from the administrator's perspective. In this example, three items ("Volume" 407, "Folder A" 408, and "Folder B" 409), representing the volumes and folders on a particular server at a specific layer in that server's file hierarchy are shown in window 412. Two other items, "Folder B 1" 411 and "Folder B2" 413, representing items in a lower layer of the file hierarchy, are shown as child items of item "Folder B" 409.

Although not shown in FIG. 4, the network administrator may also enter a particular user's or group's name into View-As pop-up 402 to view the same volumes, folders, and files but from that user's or group's perspective, i.e., according to that user's or group's access privilege. Depending on that user's or group's access privileges, some or all of items 407, 408, 409, 411, and 413 may be hidden or displayed in a different format to indicate that actual access is not possible by that user or group, e.g., because of inadequate access privilege or due to the existence of an inaccessible parent folder.

In one embodiment, the network administrator may fill in View-As pop-up window 402 by simply clicking on the View-As pop-up and choose a name from a list. In the preferred embodiment, the list includes the administrator himself, the names of the ten network users or groups for which access privileges have most recently been modified, as well as an option for entering other names if necessary.

By setting the View-As pop-up to a particular user or group, the administrator can visually confirm the access privileges actually enjoyed by a particular user or group to the file hierarchy (versus the intended privileges, which can be inadvertently blocked by, for example, an inaccessible parent item). This feature essentially allows the administrator to view the file hierarchy as if the administrator were accessing the network file hierarchy through a user's account with that user's access privileges. In reality, the network administrator merely employs that user's access privileges to view the network file hierarchy through the administrator's account. Advantageously, this aspect of the invention permits the administrator to quickly and efficiently review the result of an access privilege setting action for a shared item to determine if a user has "actual" access to that shared item.

The rest of window 412 will now be described. Within window 412, there are shown a plurality of control icons, comprising, among others, a "set access privileges" icon 403, a "propagate privileges" icon 404, an "inherit privileges" icon 405, and an "open users and groups" selection icon 406. The "set access privileges" icon 403 represents the control icon selectable by the administrator to grant access privileges to selected folders and users. The "propagate privileges" control icon 404 represents the selectable control icon for granting all enclosed folders and files in a selected parent folder the same access privileges granted to that selected parent folder. The "inherit privileges" control icon 405 represents the selectable control icon for granting a specific folder the same access privileges as the folder that encloses it. The "open users and groups" selection icon 406 represents the selectable control icon for displaying a list of network users and groups. Through this list, a user or group may then be selected and assigned access privileges to a particular volume, folder, or file.

By way of example, the administrator may select any of items 407, 408, 409, 411, and 413 in window 412. Once a particular item is selected, the administrator can then select the "Set Access Privileges" control icon 403 to define the set of users and groups that have access privileges to the selected item, as well as to define the type of access, e.g., read-only, write-only, read-and-write, and the like. In the preferred embodiment, the definition of the set of users and/or groups that have access as well as the type of access are preferably performed through a set access window that is different from window 412. This set access window is invoked when the "Set Access Privileges" control icon 403 is selected.

To the left of each of items 407, 408, 409, 411, and 413, there are shown a plurality of corresponding indicators 407(a), 408(a), 409(a), 411(a) and 413(a). Depending on its orientation, an indicator serves to indicate to the network administrator whether the item associated with it is currently "closed," e.g., its contents are not shown, or "open," e.g., the contents, if any, are currently displayed in the window. In this embodiment, an indicator is understood to denote the "closed" state when it points to the right, as shown associated with Folder A (408) in FIG. 4. When it points downward, as shown associated with item Folder B (409) in FIG. 4, it denotes the "open" state. When opened, both the item being "opened" and the child items are shown. For example, both opened item Folder B (409) and child items Folder B1 (411) and Folder B2 (413) are shown in FIG. 4. By appropriately toggling the indicators, the network administrator can choose to view, in connection with a given item, as many levels of the file hierarchy as desired.

Figure 5:
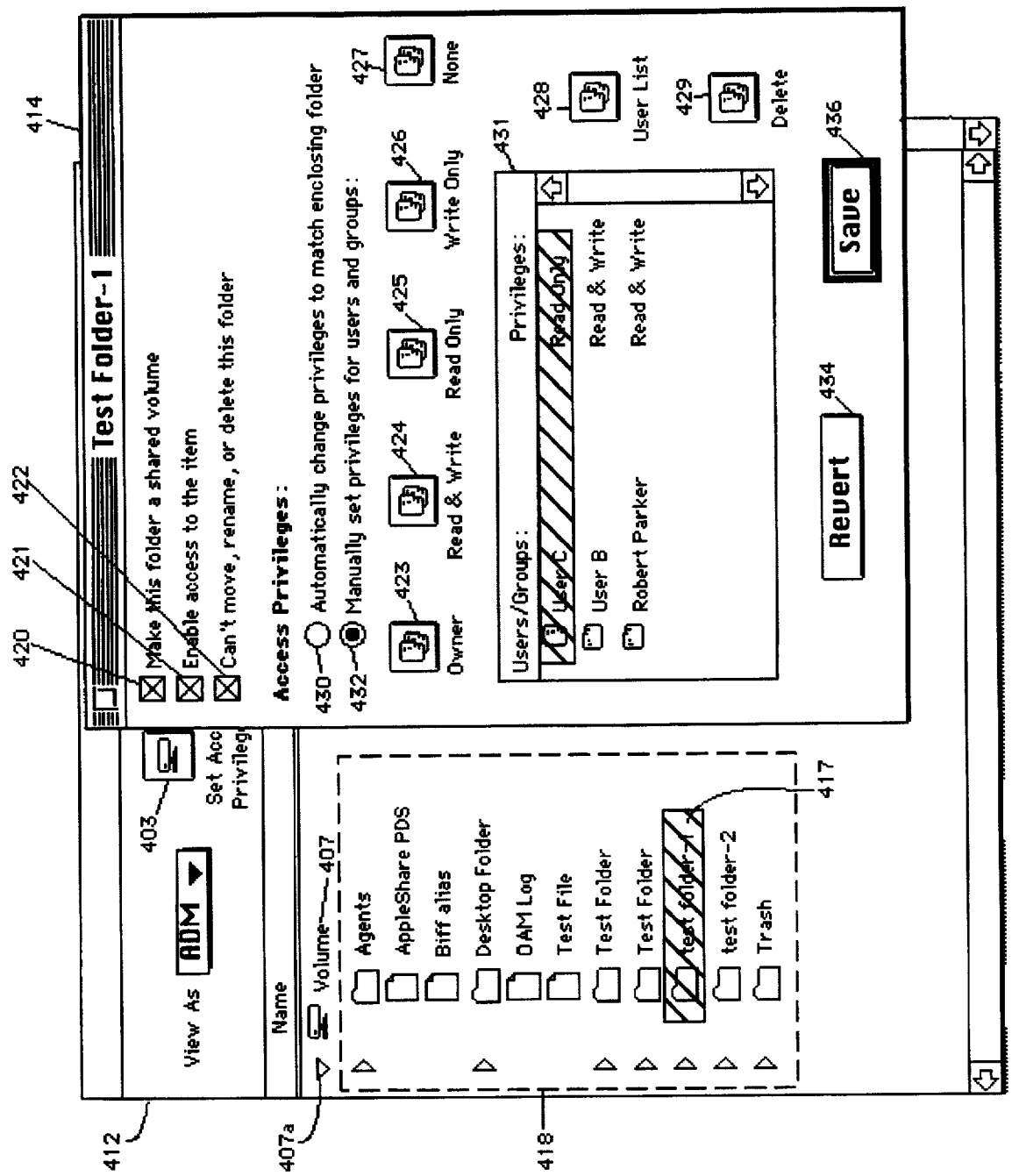
FIG. 5 shows, in another aspect of the present invention, the GUI window of FIG. 4 and a sub-window for setting access privileges for an item.

FIG. 5 shows a portion of window 412 of FIG. 4 and a set access privilege window 414 in accordance with one embodiment of the present invention. Window 412 is being viewed from the administrator's account, in accordance with his administrative privilege. In this embodiment, the View-As pop-up reads "ADM" which indicates to the administrator that he has full administrative privileges with respect to the items contained on the network servers. By way of example, the administrator may select any of the network items, and assign distinct access privileges therefor to the selected network users.

Upon selecting indicator 407a of Volume 407, the subfiles and folders contained in item Volume 407 are displayed in a typical file hierarchy fashion. In one embodiment, the file hierarchy may consist of a plurality of child items contained within their respective parent item. Similarly, the child items may contain grandchild items of the selected parent item, and this nesting process may extend indefinitely. In this example, a file hierarchy is shown having a plurality of folders and files 418, as child items of parent item Volume 407, including test folder-1 (417).

The administrator may reach the present screen set up by, for example, selecting the "set access privileges" icon 403 after test folder-1 (417) has been selected. In one embodiment, subsequent to selecting the set access privileges icon 403, window 414 entitled "test folder-1" is displayed (i.e., test folder-1 is the selected item for which access privileges will be set or modified). Although a set access privileges window is used to set or modify a particular user's access privileges in this example, alternative embodiments for modifying privileges are envisioned. For example, the same window 412 may contain areas for setting access privileges or access privilege setting may be performed in a non-GUI manner, i.e., without employing a window. Thus, the set access privileges window 414 is essentially the control panel by which access privileges are set for the particular items by selecting control icons.

For selected test folder-1 (417), in one embodiment, the administrator can check a box entitled "Make this folder a shared volume" 420. Making an item a shared volume allows the administrator to give network users and groups access to the items contained on the network servers (i.e., the item will appear as a sharepoint when viewed from the user's account, or from the administrator's account in accordance with a user's access privilege). However, if this box is not checked by the administrator, the item will not be shared, and will not appear as an available sharepoint when users, in accordance with their user privileges, view the file hierarchy on the network.

In one embodiment, the administrator can check the box entitled "Enable access to the item" 421. This command is an overriding security feature that, when checked, allows any user access to the selected items. This security feature provides the administrator the assurance of knowing that a specific item will not be accessed by a selected user unless this box is checked. In FIG. 5, if box 421 is not checked, i.e., the box does not contain an "X", the general access privileges assigned to all users, including the one in box 431, will be ignored.

An additional safety feature available to the administrator is a check box entitled "Can't move, rename, or delete this folder" 422. In this embodiment, the administrator can check box 422 to insure that the selected items will not be moved, renamed or deleted by the privileged user. This is because even though the privileged user may be entitled to read or make changes to a shared item, the administrator may not want the user to discard or move that shared item. It should be noted that alternative security features may be provided without diverting from the spirit of the invention described herein.

There is further shown a section entitled "Access Privileges" located within window 414. Here the administrator is presented with two options. In option one, the administrator can select the icon entitled "Automatically change privileges to match enclosing folder" 430. This feature allows the administrator to automatically grant the same access privileges already assigned to a particular item's parent folder.

The administrator may also select the icon entitled "Manually set privileges for users and groups" 432. This feature allows the administrator to manually set access privileges for each individual item or the folder enclosing that item by selecting icon 432. In one embodiment, the administrator selects icon 432, as shown, to maintain selective control over the access privileges a particular user may have over the selected item.

In accordance with one embodiment, two user selection icons are provided with window 414. The user selection icons allow the administrator to select the users or user groups for which access privileges will be granted. For illustration purposes, the user selection icons include, but are not limited to, a "User List" icon 428 and a "Delete" user icon 429. In this embodiment, when the administrator selects the User List icon 428, an additional window having a list of all the network users will be displayed (omitted from FIG. 5 for clarity). From this list, the administrator may select the user or user group for which access privileges to the selected item, e.g., test folder-1 (417) will be granted. The administrator may also select the Delete user icon 429 to delete a selected user from the list of active users in sub-window 431.

In FIG. 5, a plurality of access privilege selection icons are also provided within window 414. There is an icon entitled "Owner" 423. If the administrator selects the Owner 423 icon, the selected user, e.g., user C in sub-window 431, will be given owner-type privileges with respect to the selected item, e.g., test folder-1 (417). Other privilege selection icons may also be provided, including a "Read & Write" icon 424, a "Read Only" icon 425, a "Write Only" icon 426, and a "None" icon 427. These selection icons are arranged about window 414 of FIG. 5 to allow the administrator, the ability to selectively grant or modify access privileges for a selected item. By way of example, sub-window 431 shows that user C has been added to the list of users having access to the selected item, e.g., test folder-1 (417), and is granted only the ability to "read," but not "write."

In one embodiment, the administrator may want to store the access privilege selections granted by clicking on the "Save" icon 436. This assures the administrator that his selection will be kept in a file until a modification is made. Alternatively, in one embodiment, the administrator may wish to revert back to the original access privileges (before the current modifications), by selecting the "Revert" icon 434.

Figure 6:
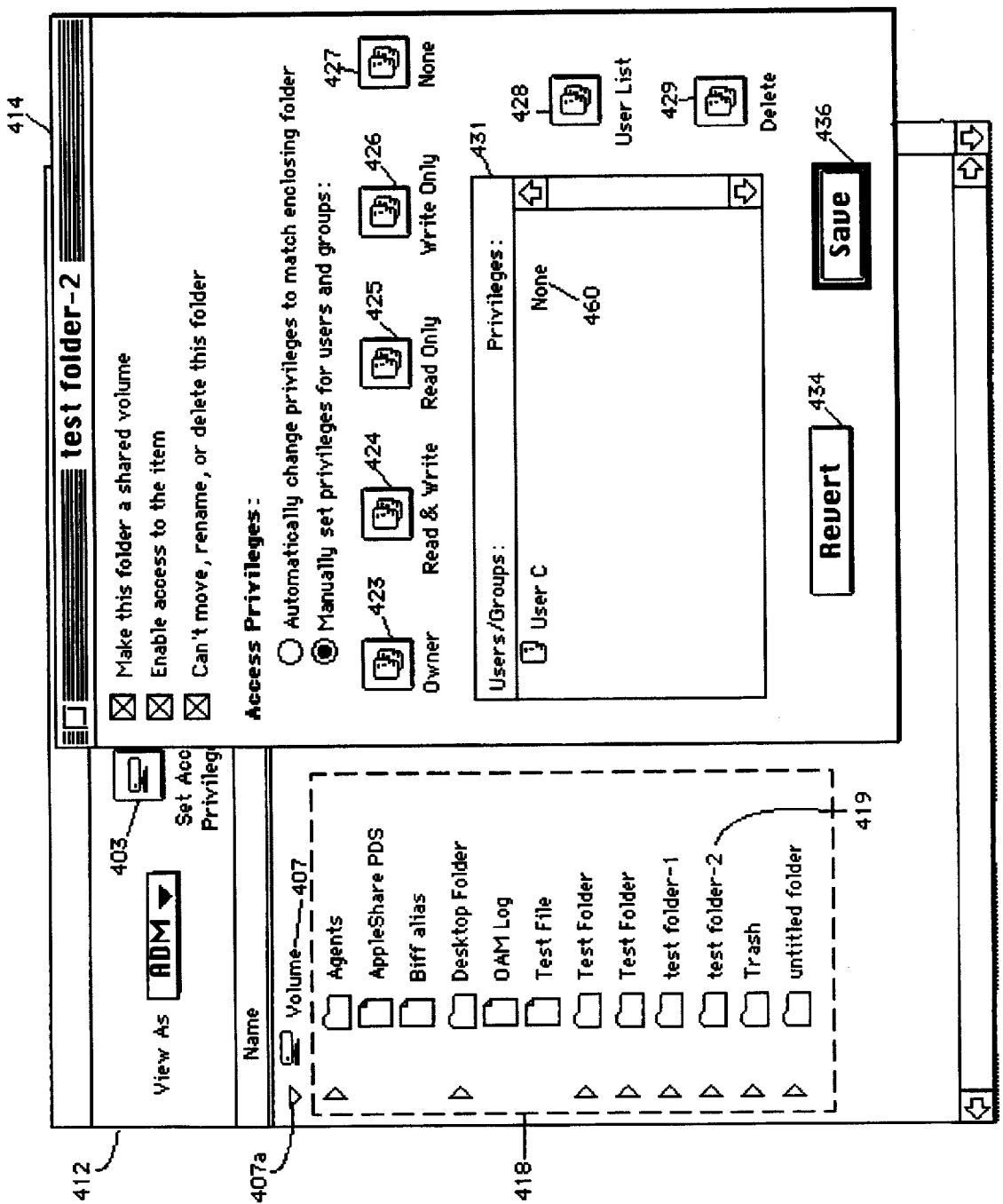
FIG. 6 shows the GUI window of FIG. 4 and a sub-window for setting access privileges for another item.

FIG. 6 also shows, in accordance with one embodiment, a portion of window 412 of FIG. 4, and set access privilege window 414. Window 412 is shown viewed from the administrator's account, in accordance with the administrator's privilege. In this example, test folder-2 is selected by the administrator for access privilege setting.

For illustration purposes, in window 431, user C is shown having no access privilege to test folder-2 (indicated by the word "None" 460). Of course, the access privilege of user C with respect to test folder-2 (418b) may be modified via icons 423-429, 434, and 436. Further, the number of users having access to test folder-2 in window 431 may be increased or decreased as desired.

Figure 7:
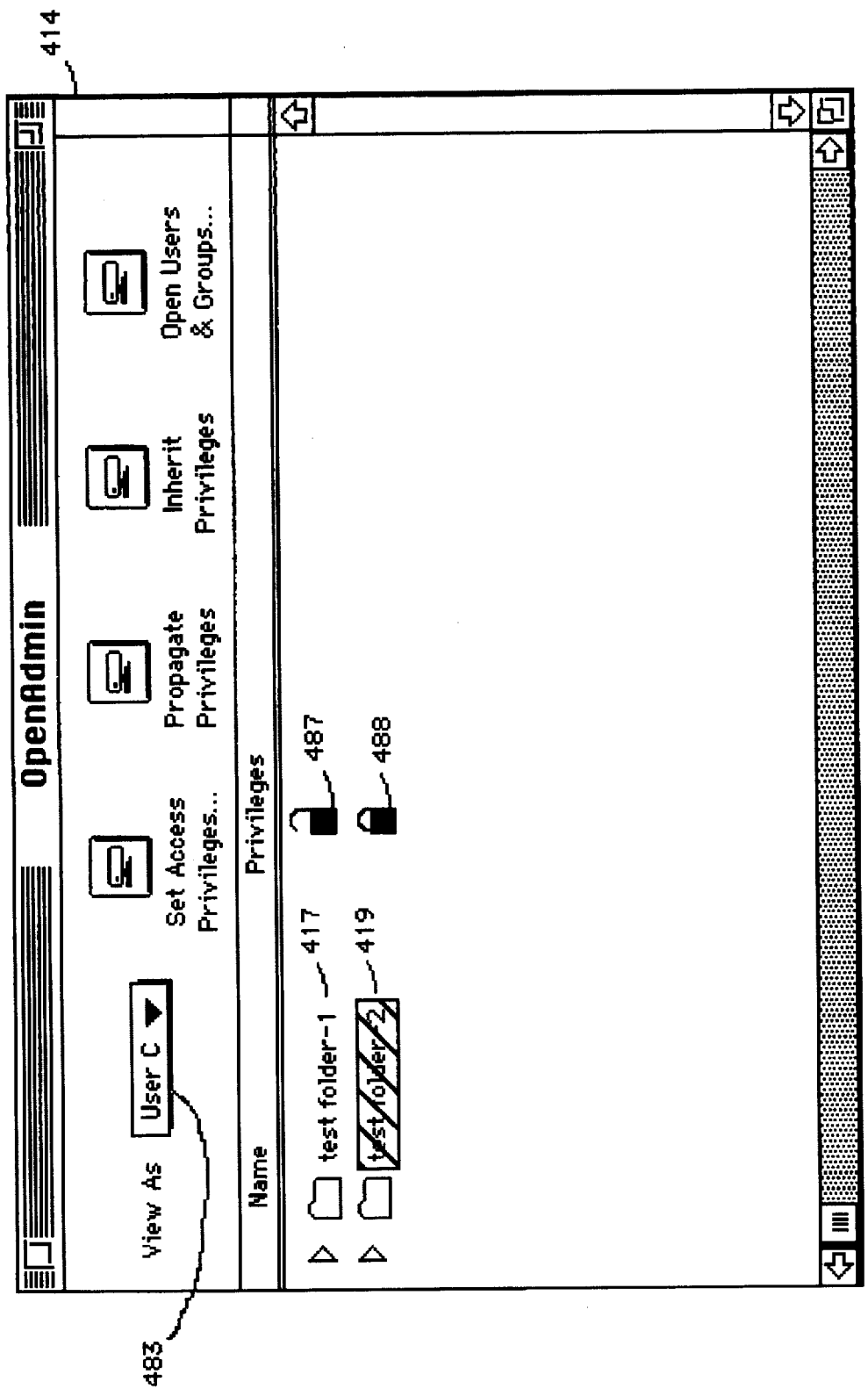
FIG. 7 shows, in accordance with another aspect of the present invention, the GUI window of FIG. 4 wherein the sharepoints are displayed in accordance with a user's access privilege.

FIG. 7 shows window 412 where, in one embodiment, the administrator is viewing all the sharepoints as if the administrator were viewing them from user C's account. To employ this feature, the administrator may, in one embodiment, click on the View-As pop-up icon 483 and select user C. When View-As pop-up icon 483 is first clicked, the administrator may be presented with a list of ten most recently accessed users to select from. If the administrator does not find the desired user on the list of ten, he may then select "others," which presents him with a master list of all registered network users to select from.

When the administrator views as user C, the administrator is viewing from user C's perspective (i.e., in accordance with user C's access privileges as if the administrator was sitting at user C's client terminal). Note that in reality, the administrator is still operating through the administrator's account. In FIG. 7, two sharepoints are shown, corresponding to the two folders described in FIGS. 5 and 6.

In FIG. 7, the first sharepoint is test folder-1 (417), and the second sharepoint is test folder-2 (419). Since the administrator granted user C read access privileges to test folder-1 (417) in FIG. 5, test folder-1 (417) is shown to be accessible in FIG. 7 (by open lock icon 487 and by the fact that "test folder-1" is not ghosted, grayed out, or hidden). On the other hand, test folder-2 (419) is in a ghosted state indicating no access to test folder-2. In other embodiments, test folder-2 (419) may be grayed out, shaded, or hidden altogether. The indication of no access to test folder-2 is consistent with the administrator setting of user C's access to "None" in FIG. 6.

In one embodiment, it is envisioned that a user accessing the network via its user privilege, will be able to distinguish whether the listed sharepoints are inaccessible, or accessible for read & write, read-only or write only via various access indicating icons. For illustration purposes, an open or closed lock icon will denote respectively user access privilege granted or no user access privilege. The open lock icon 487 is shown associated with sharepoint test folder-1 indicating access privilege for user C for this item. The closed lock icon 488 is shown associated with sharepoint test folder-2 indicating no access privileges. Alternative embodiments may include, but are not limited to, a set of "eye glasses" indicating read privileges, a "lock and key" indicating no access and a "writing instrument" indicating write privileges.

In yet another embodiment, the administrator is given the added flexibility of modifying user access privileges when viewing from the perspective of a selected user. This is possible when the administrator is viewing the file hierarchy through his administrator's account, whether in accordance with his administrator's privilege or with a user's access privilege. For example, in FIG. 7 the administrator while viewing sharepoints from the user's perspective, i.e., in accordance with that user's access privilege, may determine that the access privilege for a particular sharepoint is incorrect. At this point the administrator can simply select the sharepoint, and select "set access privileges" icon 403 to make the appropriate modification. In this embodiment, the administrator is not required to View-As the administrator (i.e., view from the administrator's account) in order to modify sharepoint access privileges.

Figure 8:
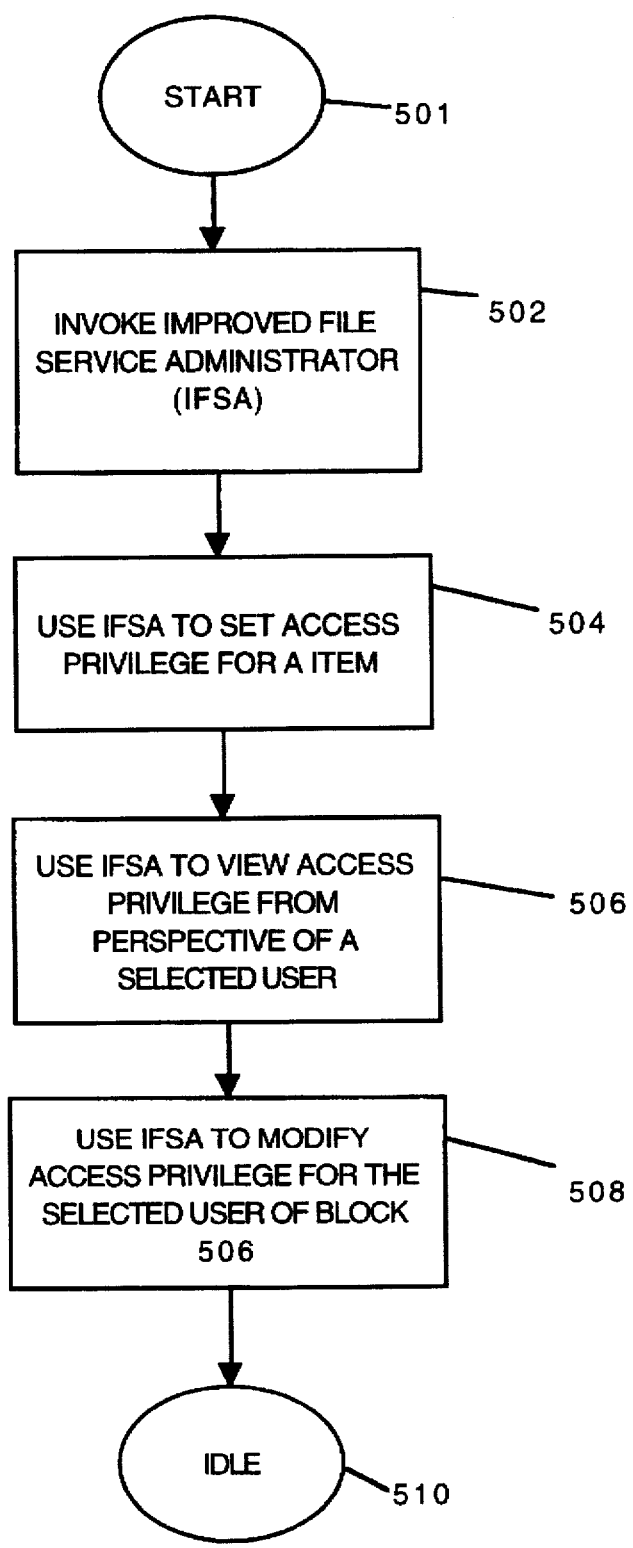
FIG. 8 is a flowchart illustrating, in one aspect of the present invention, the steps for setting, modifying and viewing access privileges for shared items from the administrator's account.

FIG. 8 is a flowchart illustrating the steps for setting, viewing and modifying access privileges from the administrator's account in accordance with one embodiment of the present invention. FIG. 8 starts at block 501. From block 501, the method proceeds to block 502 to invoke the improved file service administration apparatus (IFSA). In one embodiment, invoking the IFSA brings up the IFSA window. The IFSA window may resemble the GUI window 412 of FIG. 4 or a similarly suitable window for viewing the file hierarchy and setting access privileges for the items in the file hierarchy. Generally, the IFSA is invoked by the network administrator from the administrator's console, e.g., administrator console 108 of FIG. 1.

From block 502, the method proceeds to block 504 wherein the network administrator employs the IFSA to set access privileges for a selected item in the file hierarchy that is displayed when the IFSA is invoked in block 502. This selected item may be either a volume, a folder, or even a file if appropriate. Note that in block 504, the access privilege setting for the selected item is performed through the administrator's account from the administrator's perspective, i.e., in accordance with administrator's privileges. As such, all items in the server file hierarchy are displayable for the administrator's selection. Further, since the file hierarchy is displayed through the administrator's account, the items therein may have their access privileges modified. In one embodiment, access privilege setting for a selected item is accomplished by selecting that item, adding or removing a user's or group's name to the list of users or groups having access to that item, and specifying the type of access privilege that that user or group may have. As mentioned earlier, a user's or group's name may be selected from a list of registered network users. Thereafter, the administrator can chose to save the changes in a file, or revert back to the original access privileges for the selected item.

From block 504, the method proceeds to block 506, wherein the administrator employs the IFSA to view access privileges associated with items in the file hierarchy from the perspective of a selected user, i.e., in accordance with that user's access privilege. Viewing access privileges from the perspective of a selected user means that the administrator, while viewing through the administrator's account, actually perceives the file hierarchy and the accessibility of its items as if he were the selected user viewing the file hierarchy from that user's own account.

When the administrator views the access privileges from the perspective of a selected user, items that are actually rendered accessible or remain inaccessible by the administrator's access privilege setting actions for that selected user are shown accordingly. In this manner, the administrator can quickly determine whether his access privilege setting actions accomplished their intended purposes. This feature is highly advantageous when the network administrator, working on his administrative console, is physically located at a location that is geographically remote from the client terminals and wishes to determine what access privilege a particular user has when accessing the network files from that particular user's terminal.

In one embodiment, the administrator selects to view the access privileges from the perspective of a selected user by selecting the View-As pop-up menu in the IFSA window and entering in the pop-up menu the name of the selected user. To illustrate, reference should now be made to FIG. 7. Suppose the network administrator specifies, in block 504, that user C shall have access to test folder-1. To view the changes from the perspective of user C in block 506, the administrator would enter the name of user C, e.g., "user C," into the View-As pop-up 483 of FIG. 7. The result is shown in FIG. 7, where test folder-1 is shown to be accessible (indicated by open lock icon 487) and test folder-2 is shown to be inaccessible (indicated by closed lock icon 488 and its grayed out state). Note that the accessibility conditions of test folder-1 (417) and test folder-2 (419) are shown as if the administrator were user C looking at these folders from user C's own account. In reality, the administrator is actually viewing these folders from the administrator's account, albeit from user C's perspective (as indicated in View-As pop-up 483). Note that if the administrator had been viewing these folders from the administrator's own perspective, i.e., in accordance with administrator's privileges, both of test folders 1 and 2 would be shown to be accessible since, by definition, the administrator has access to all items in the file hierarchy.

From block 506, the method proceeds to block 508 where the IFSA is used to modify the access privileges to one or more of the items in the file hierarchy that is displayed in block 506. Note that the modification may be performed while viewing the file hierarchy from the administrator's perspective. More preferably, the access privileges for a particular user or group with respect to the file hierarchy items are modified while the network administrator views the file hierarchy from the perspective of that user. This way, the administrator can set the access privileges for a particular user or group to the file hierarchy items in block 502, check his work in block 504 from that user's perspective, and perform any necessary modifications in block 506 without having to revert to the administrator's perspective.

For illustration purposes, suppose the administrator had intended to grant read and write access privileges to user C for both test folder-1 and test folder-2 of FIG. 7 (in accordance with block 504). When viewing from user C's perspective in block 506, the administrator then notices that user C actually does not have access to test folder-2. In this case, the administrator can immediately correct the access privilege for test folder-2 by, for example, selecting item "test folder-2" and the "set access privileges" icon in FIG. 7 and making the appropriate modification. Note that this modification is advantageously made while the administrator views test folder-1 and test folder-2 from user C's perspective. The modification is possible because the administrator is still operating from within the administrator's account. If user C's account had been employed instead, either by the administrator or by user C himself, to check user C's actual access privileges for the server file hierarchy items, such modification would have been prohibited since modification of user access privileges from a user's account is typically not permitted in most networks.

From block 508, the method proceeds to block 510 where the IFSA becomes idle until the network administrator employs it again to perform an action in one of blocks 504, 506, or 508.

Figure 9:
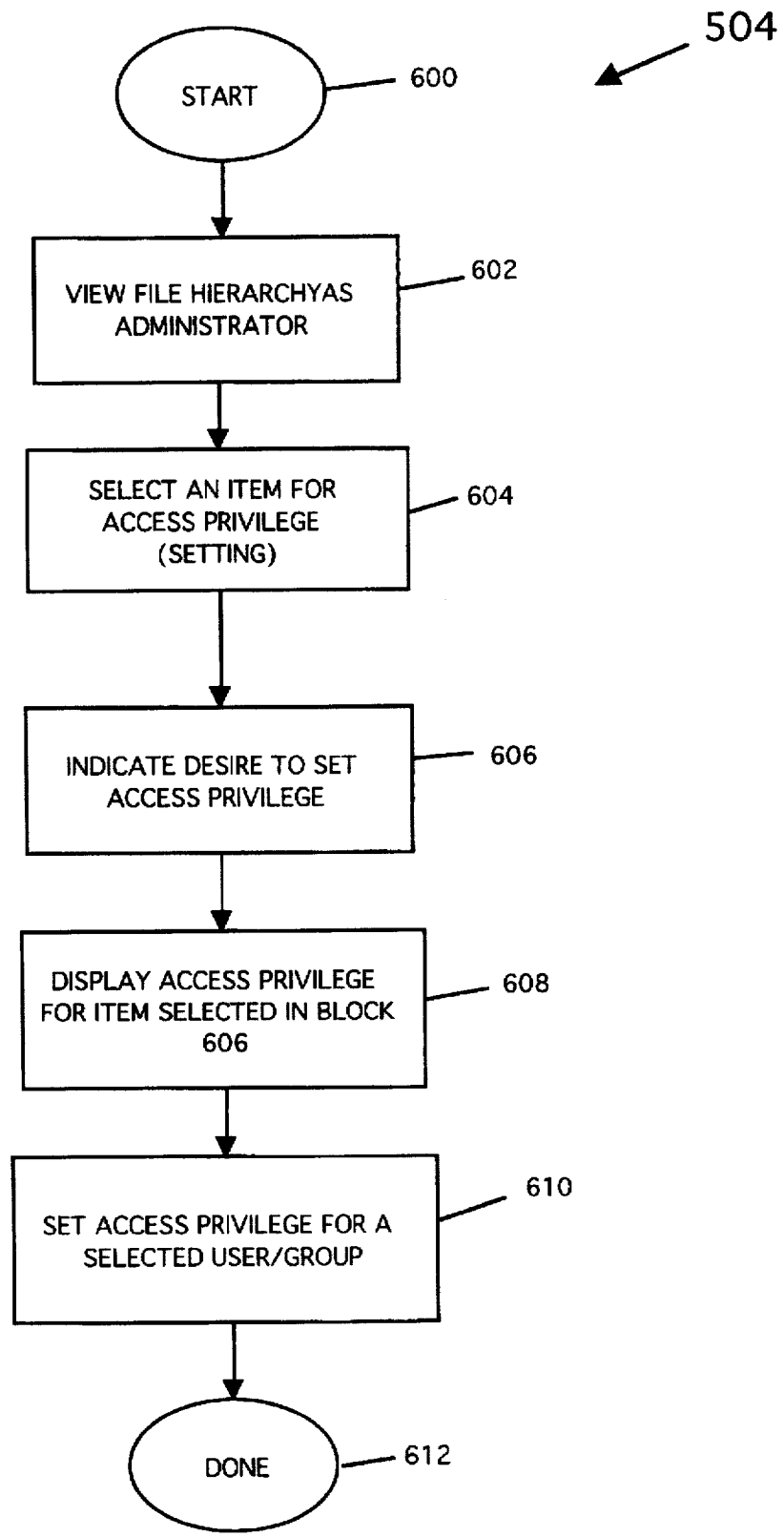
FIG. 9 is a flowchart illustrating, in one aspect of the present invention, the steps for setting access privileges for a selected item.

FIG. 9 shows, in accordance with one aspect of the present invention, the steps for using the IFSA to set access privileges for an item of block 504 of FIG. 8. FIG. 9 starts at block 600. From block 600, the method proceeds to block 602 to view the file hierarchy as administrator. In one embodiment, the administrator, through his administrative privilege, is able to view all of the items at any given layer in the file hierarchy. If an item is a sharepoint, i.e., it is capable of being accessed by a network user having sufficient access privileges, that item will be so indicated. In this embodiment, the items are shown in a window similar to that shown in FIG. 4 or a similarly suitable display window.

From block 602, the method proceeds to block 604 where the administrator selects an item for access privilege setting. During the access privilege setting step, the administrator determines which one of the plurality of items in the file hierarchy will be singled out for access privilege setting. For illustration purposes, in one embodiment, selection can be accomplished by moving the cursor to a particular file or folder that the administrator desires to set access privileges for, and highlights the selection. As shown in FIG. 5, the administrator's privilege allows the administrator to select test folder-1 (417) for access privilege setting.

From block 604, the method proceeds to block 606 where the administrator indicates a desire to set access privileges for the item selected in block 604. In the example herein, this is accomplished by clicking on the "set access privileges" icon 403 of FIG. 4. Although selection is described as a mechanical clicking motion (e.g., clicking a computer keyboard mouse), alternative selection techniques may be used, such as, employing a touch screen or simply using a keypad.

From block 606, the method proceeds to block 608, where the access privileges for the item selected in block 606 are displayed. In one embodiment, upon selecting an item for access privilege setting, and indicating the desire to set the access privilege therefor, the program brings up a second window, e.g., window 414 in FIG. 5 through which the access setting actions may be performed.

From block 608, the method proceeds to block 610, where the set access privilege for a selected user/group is accomplished. In this step, the users or groups that are allowed to access the item selected in block 604 are defined. In one embodiment, users or groups means the users or user groups registered on one of the various servers connected to the computer network of FIG. 1.

By way of example, sub-window 431 of FIG. 5 contains the list of users and groups currently having access to item test folder-1. The administrator may add or delete a user or group from this list. Further, the administrator may select any of the users or user groups in the list to modify the type of access privilege that those users or groups may have. For example, upon selecting a particular user or user group, the administrator may then grant privileges which may consist of Owner (being an Owner gives the user access privileges similar to that of the administrator), Read & Write, Read Only, Write Only, or no privileges by clicking on the appropriate icons in FIG. 5.

From block 610, the method proceeds to block 612, where the step of using the IFSA to set access privileges for an item of block 504 (FIG. 8) is done.

Figure 10:
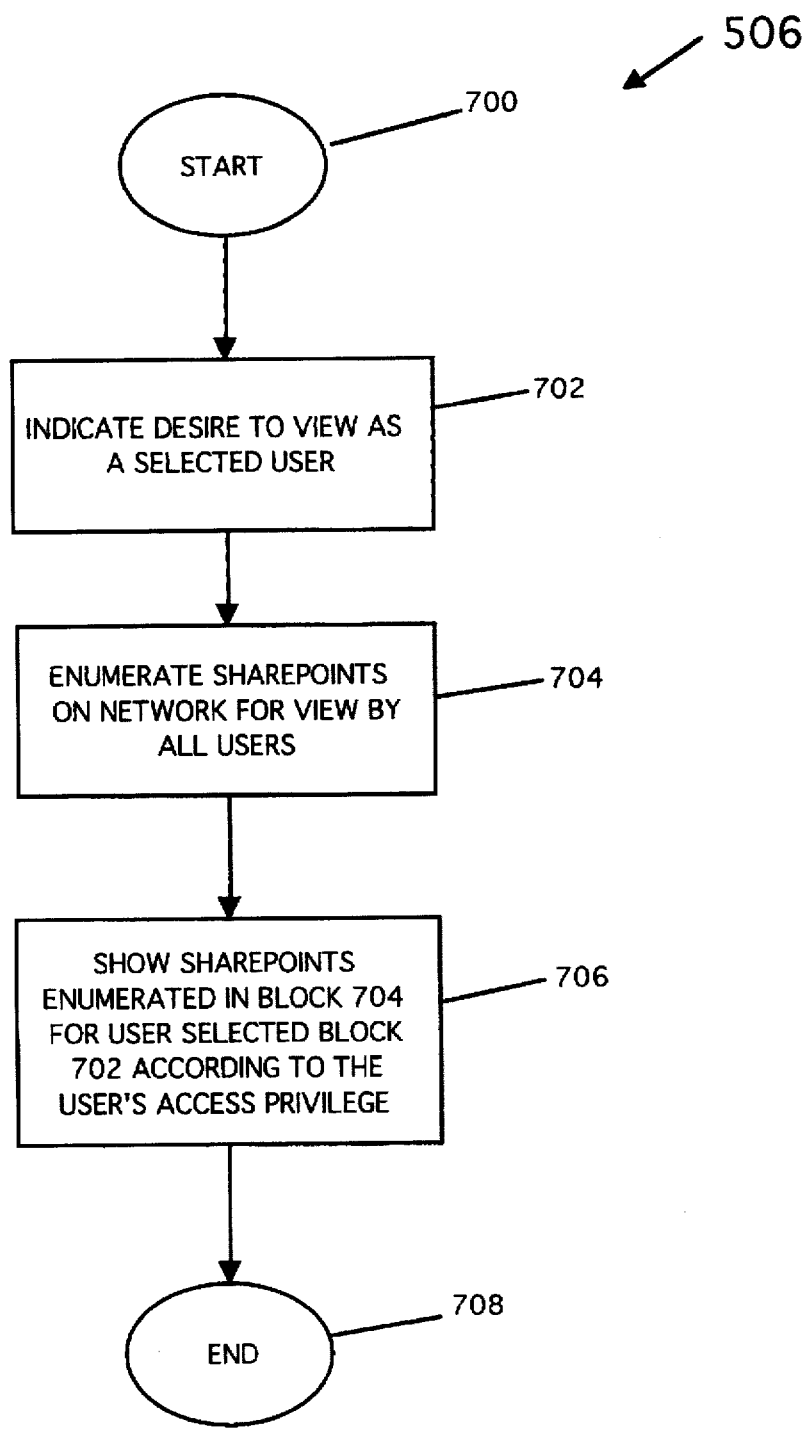
FIG. 10 is a flowchart illustrating, in one aspect of the present invention, the steps for viewing access privileges of a selected folder according to a user's privilege from the administrator's account.

FIG. 10 shows in greater detail the steps for using the IFSA to view access privileges from the account of a selected user of block 506 (FIG. 8.) in accordance with one aspect of the invention. FIG. 10 starts at block 700. From block 700, the method proceeds to block 702 where the administrator indicates a desire to view as a selected user.

When the administrator desires to view as a selected user, the administrator is typically attempting to confirm whether or not a particular user has the access privileges the administrator intended.

In one embodiment, this is accomplished when the administrator clicks on the View-As pop-up icon 483, of FIG. 7. The administrator then selects a specific user to confirm that user's access privileges. For illustration purposes, in one embodiment, user C is selected as shown in FIG. 7. In this example, the administrator is viewing user C's access privileges as if the administrator was viewing from user C's account. In this manner, the administrator may ascertain whether user C has the correct access privileges.

From block 702, the method proceeds to block 704 where, in one embodiment, the IFSA enumerates the sharepoints on the network to be viewed by all network users. Essentially, the IFSA determines, for each item in the file hierarchy, whether that item has been designated for sharing by the network users. In one embodiment, FIG. 7 illustrates test folder-1 and test folder-2 as being sharepoints 417 and 419 respectively. This means that user C, when viewing from his user's account can identify sharepoints 417 and 419 as being shared items. Although only two sharepoints are displayed in FIG. 7, it is envisioned that a greater or fewer number of sharepoints may be enumerated and displayed.

From block 704, the method proceeds to block 706 where, in one embodiment, the sharepoints enumerated in block 704 are shown for the user selected in block 702 in accordance with that selected user's access privilege. Essentially, the IFSA determines, for each sharepoint, the type of access privilege the selected user has to that sharepoint. In this embodiment, because all of the sharepoints are enumerated and displayed, it is advantageous to show whether a selected user has access to particular enumerated sharepoints as well as the type of access granted.

From block 706, the method proceeds to block 708 where the step of viewing access privilege from the account of a selected user ends.

Figure 11:
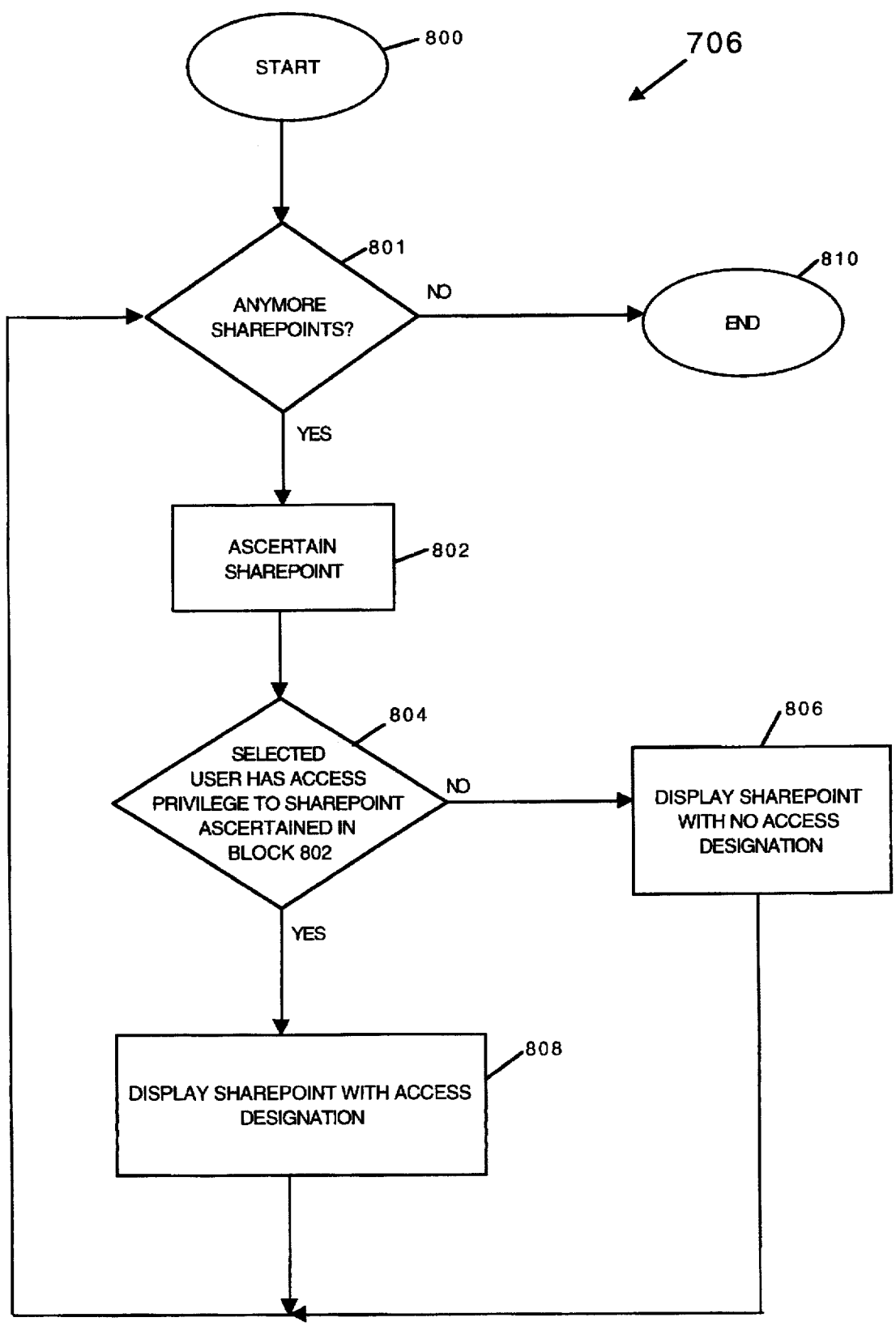
FIG. 11 is a more detailed flowchart illustrating, in one aspect of the present invention, the steps for displaying sharepoints in accordance with a user's privilege.

FIG. 11 shows in greater detail block 706 of FIG. 10 where, in one embodiment, selected sharepoints are displayed according to the users access privilege. FIG. 11 starts at block 800. From block 800, the method proceeds to block 801 where the IFSA determines whether there are any more sharepoints in the list of sharepoints enumerated in block 704 of FIG. 10. If there are no more sharepoints to display, the steps of FIG. 11 end at block 810. On the other hand, if there remains sharepoints to be checked, the method proceeds to block 802 to ascertain the next sharepoint in the list.

From block 802, the method proceeds to block 804 where, in one embodiment, the IFSA determines whether a selected user has access privileges to the sharepoint ascertained in block 802. In one embodiment, the user may have any of the privileges described in connection with FIG. 5.

If the user does not have access privilege to the ascertained sharepoint, the method proceeds to block 806 where, in one embodiment, the sharepoint would be displayed in a "no access" state. On the other hand, if the selected user has any type of access privilege to a sharepoint ascertained in block 802, the method proceeds from block 804 to block 808 where the ascertained sharepoint is displayed in an "access allowed" state. As mentioned earlier, these states may be indicated by distinct icons or through visually distinct presentation methods.

From block 808, and block 806, the method returns to block 801 where the method again proceeds through the steps to determine whether the user has access privileges to the sharepoints enumerated in block 704 of FIG. 10.

Although the preferred embodiments of the present invention have been described in detail, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. In a computer network having an administrator account and a user account, said administrator account having an administrator privilege, said user account having a user privilege different from said administrator privilege, said computer network further including at least one sharepoint that is selectively accessible by said user account, a method of assigning access privilege on a computer display screen to said sharepoint for said user account, comprising:

displaying, in accordance with said administrator privilege and through said administrator account, said sharepoint on said computer display screen;

modifying, through said administrator account, said access privilege for said user account; and displaying, in accordance with said user privilege through said administrator account, said sharepoint and said access privilege for said user account, such that said sharepoint and said access privilege that is displayed through said administrator account is viewed substantially in the same manner as said sharepoint would have been represented had said sharepoint been displayed through said user account, and said sharepoint, when displayed in accordance with said user privilege, is represented in a first state when said access privilege for said user account to said sharepoint is enabled, said sharepoint, when displayed in accordance with said user privilege, is represented in a second state when said access privilege for said user account to said sharepoint is not enabled.

2. The method of claim 1, wherein said step of displaying in accordance with said user privilege comprises the step of selecting a user from a selection menu.

3. The method of claim 2, wherein said step of displaying in accordance with said administrator privilege comprises the step of selecting an administrator from said selection menu.

4. The method of claim 1, wherein said sharepoint is substantially visible when represented in said first state.

5. The method of claim 4, wherein said sharepoint is ghosted when viewed in said second state such that said sharepoint is still partially visible but less visible than when said sharepoint is displayed in said first state.

6. The method of claim 1, wherein said sharepoint, when represented in said first state, is displayed in said computer display screen along with a first icon.

7. The method of claim 6, wherein said sharepoint, when represented in said second state, is displayed in said computer display screen along with a second icon that is visually different from said first icon.

8. The method of claim 1, further comprising the step of modifying said access privilege when said sharepoint and said access privilege are displayed through said administrator account and in accordance with said user privilege, said access privilege being otherwise incapable of being modified when displayed through said user account in accordance with said user privilege.

9. An apparatus for assigning access privileges to a sharepoint in a computer network having an administrator account and a user account, said administrator account having an administrator privilege, said user account having a user privilege different from said administrator privilege, said sharepoint being selectively accessible by said user account, comprising:

means for displaying, in accordance with said administrator privilege and through said administrator account, said sharepoint on a computer display screen;

means for modifying, through said administrator account, said access privilege for said user account; and means for displaying, in accordance with said user privilege through said administrator account, said sharepoint and said access privilege for said user account, such that said sharepoint and said access privilege that is displayed through said administrator account is viewed substantially in the same manner as said sharepoint would have been represented had said sharepoint been displayed through said user account, and said sharepoint, when displayed in accordance with said user privilege, is represented in a first state when said access privilege for said user account to said sharepoint is enabled, said sharepoint, when displayed in accordance with said user privilege, is represented in a second state when said access privilege for said user account to said sharepoint is not enabled.

10. The apparatus of claim 9, wherein said means for displaying in accordance with said user privilege comprises means for selecting a user from a selection menu.

11. The apparatus of claim 10, wherein said means for displaying in accordance with said administrator privilege comprises means for selecting an administrator from said selection menu.

12. The apparatus of claim 9, further comprising means for modifying said access privilege when said sharepoint and said access privilege are displayed through said administrator account and in accordance with said user privilege, said access privilege being otherwise incapable of being modified when displayed through said user account in accordance with said user privilege.

13. A computer readable medium containing program instructions for assigning access privileges to a sharepoint for a user account in a computer network having an administrator account and said user account, said administrator account having an administrator privilege, said user account having a user privilege different from said administrator privilege, said computer network further including at least one sharepoint that is selectively accessible by said user account, said instructions comprising the steps of:

displaying, in accordance with said administrator privilege and through said administrator account, said sharepoint on said computer display screen;

modifying, through said administrator account, said access privilege for said user account; and displaying, in accordance with said user privilege through said administrator account, said sharepoint and said access privilege for said user account, such that said sharepoint and said access privilege that is displayed through said administrator account is viewed substantially in the same manner as said sharepoint would have been represented had said sharepoint been displayed through said user account, and said sharepoint, when displayed in accordance with said user privilege, is represented in a first state when said access privilege for said user account to said sharepoint is enabled, said sharepoint, when displayed in accordance with said user privilege, is represented in a second state when said access privilege for said user account to said sharepoint is not enabled.

14. The computer readable medium of claim 13, wherein said step of displaying in accordance with said user privilege comprises the step of selecting a user from a selection menu.

15. The computer readable medium of claim 14, wherein said step of displaying in accordance with said administrator privilege comprises the step of selecting an administrator from said selection menu.

16. The computer readable medium of claim 13, wherein said sharepoint is substantially visible when represented in said first state.

17. The computer readable medium of claim 16, wherein said sharepoint is ghosted when viewed in said second state such that said sharepoint is still partially visible but less visible than when said sharepoint is displayed in said first state.

18. The computer readable medium of claim 13, further comprising the step of modifying said access privilege when said sharepoint and said access privilege are displayed through said administrator account and in accordance with said user privilege, said access privilege being otherwise incapable of being modified when displayed through said user account in accordance with said user privilege.

* * * * *